US012188368B2

(12) United States Patent
Kolvick et al.

(10) Patent No.: US 12,188,368 B2
(45) Date of Patent: Jan. 7, 2025

(54) METHOD FOR REMOVING OR INSTALLING A DIFFUSER SEGMENT OF A TURBINE ASSEMBLY

(71) Applicant: GE INFRASTRUCTURE TECHNOLOGY LLC, Greenville, SC (US)

(72) Inventors: Sandra Beverly Kolvick, Simpsonville, SC (US); Thomas Alan Mogle, II, Simpsonville, SC (US); Eric Lynn Strunk, Rockford, OH (US); William Thomas Ordean, Sidney, OH (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/223,267

(22) Filed: Jul. 18, 2023

(65) Prior Publication Data

US 2024/0141806 A1 May 2, 2024

Related U.S. Application Data

(62) Division of application No. 17/977,062, filed on Oct. 31, 2022, now Pat. No. 11,746,678.

(51) Int. Cl.
*F01D 25/28* (2006.01)

(52) U.S. Cl.
CPC ........ *F01D 25/285* (2013.01); *F05D 2230/64* (2013.01); *F05D 2230/68* (2013.01); *F05D 2230/70* (2013.01); *F05D 2250/75* (2013.01); *F05D 2260/31* (2013.01)

(58) Field of Classification Search
CPC ............... F01D 25/285; F05D 2230/64; F05D 2230/68; F05D 2230/70; F05D 2250/75; F05D 2260/31
See application file for complete search history.

(56) References Cited

U.S. PATENT DOCUMENTS

| | | | | |
|---|---|---|---|---|
| 4,014,627 | A | 3/1977 | Heurteux | |
| 6,079,943 | A | 6/2000 | Sexton et al. | |
| 10,072,526 | B2 | 9/2018 | Clark et al. | |
| 10,125,689 | B2 * | 11/2018 | Biffle | F01D 25/285 |
| 10,132,198 | B2 * | 11/2018 | Baba | F01D 25/28 |
| 10,287,920 | B2 * | 5/2019 | Jamiolkowski | F02C 3/04 |
| 11,846,208 | B2 * | 12/2023 | Ju | F01D 9/042 |
| 2010/0101065 | A1 | 4/2010 | Macchia et al. | |

FOREIGN PATENT DOCUMENTS

| | | |
|---|---|---|
| CA | 2862049 | 7/2013 |
| WO | 2008012195 | 1/2018 |

* cited by examiner

*Primary Examiner* — Bayan Salone
(74) *Attorney, Agent, or Firm* — Grogan, Tuccillo & Vanderleeden LLP

(57) ABSTRACT

An apparatus configured to support a diffuser segment during removal from and installation into an assembly. The apparatus includes a body having two or more supports and at least two clamp rods. The clamp rods each extend from a first end to a second end. The body defines a pocket extending between the supports on a first side of the clamp rods. An end clamp releasably mates with the second end of each clamp rod. The end clamp has a foot extending into the first side of the clamp rod. A wheel is received within each support. The pocket and the foot of each end clamp releasably retain a diffuser segment and the wheels rotate to allow the diffuser segment to be removed without damaging a surface coating of the diffuser segment.

15 Claims, 6 Drawing Sheets

METHOD FOR REMOVING OR INSTALLING A DIFFUSER SEGMENT OF A TURBINE ASSEMBLY

CROSS REFERENCE TO RELATED APPLICATIONS

The present patent application is a divisional of U.S. application Ser. No. 17/977,062, filed 31 Oct. 2022, which is hereby incorporated by reference in its entirety to provide continuity of disclosure.

BACKGROUND

Technical Field

Embodiments of this disclosure relate generally to gas turbines, and more specifically, to an apparatus that releasably mates with a replaceable part and protects a surface coating of the part during removal and installation of the part within a surrounding gas turbine assembly.

Discussion of Art

Rotary machines such as gas turbines contain complicated assemblies in which a large, heavy diffuser is retained within a housing or compressor discharge case. Generally, the diffuser has an annular shape that surrounds a central axis that is occupied by a spacer that is retained within the assembly. The diffuser is supplied and installed in separate panels or diffuser segments.

Generally, diffusers must be coated to prevent rust from forming. The assembly is initially assembled in a vertical orientation, in which the diffuser is stacked around the spacer. Repairs and maintenance generally operate on an assembly that is retained in a horizontal direction. This orientation makes removal of the annular diffuser difficult and time consuming. In order to spray the diffuser with a surface coating, as currently known in the art, diffuser segments must be removed from the assembly in order to coat the diffuser segments and reinsert them into the assembly without damaging the surface coating. Requiring the removal of turbine hardware in addition to the diffuser segments in this manner adds significant time and effort to the process, and in some cases it can add multiple days to the duration of the outage of the gas turbine.

As a result, there exists a need for an apparatus that releasably secures to diffuser segments to provide for safe removal and re-installation of the diffuser segments in the field without requiring the removal of the spacer.

BRIEF DESCRIPTION

The following presents a simplified summary of the disclosed subject matter in order to provide a basic understanding of some aspects of the various embodiments described herein. This summary is not an extensive overview of the various embodiments. It is not intended to exclusively identify key features or essential features of the claimed subject matter set forth in the Claims, nor is it intended as an aid in determining the scope of the claimed subject matter. Its sole purpose is to present some concepts of the disclosure in a streamlined form as a prelude to the more detailed description that is presented later.

In accordance with one embodiment, an apparatus configured to support a diffuser segment during removal from an assembly is provided. The apparatus includes a body having two or more supports and at least two clamp rods. The clamp rods each extend from a first end to a second end. The body defines a pocket extending between the supports on a first side of the clamp rods. An end clamp releasably mates with the second end of each clamp rod. The end clamp has a foot extending into the first side of the clamp rod. A wheel is received within each support. The pocket and the foot of each end clamp releasably retain a diffuser segment and the wheels rotate to allow the diffuser segment to be removed without damaging a surface coating of the diffuser segment or the surface coating of the neighboring casing.

In accordance with another embodiment, a method of removing or reinstalling a diffuser segment from an assembly with an apparatus is provided. The method includes drilling and tapping a lift hole in a surface of the diffuser segment with a drill guide, installing a lift eye in the lift hole, removing one or more mounting bolts affixing the diffuser segment to the assembly, replacing the removed one or more mounting bolts with one or more guide pins, inserting the apparatus between the diffuser segment and the assembly, rolling the apparatus into a void defined between the diffuser segment and the assembly, tightening at least one end clamp of the apparatus configured to retain the diffuser segment within the apparatus, tightening at least one set screw configured to tighten a pocket of the apparatus on an exterior surface of the diffuser segment, removing all remaining mounting bolts affixing the diffuser segment to the assembly, turning the at least one guide pin to engage the pin into the diffuser, and then pushing the diffuser segment to disengage the diffuser segment from the assembly, removing the one or more guide pins from the diffuser segment and the assembly, and lifting the lift eye to remove or reinstall the diffuser segment from the assembly. The pocket is configured to protect the exterior surface of the diffuser segment during removal of the diffuser segment from the assembly.

In accordance with an alternate embodiment, an apparatus configured to support a diffuser segment during removal from an assembly is provided. The apparatus includes a body defined by a curve that is complementary to an exterior surface of the diffuser segment. The body has a support, a clamp rod, and defines a pocket. The clamp rod extends from a first end to a second end and the pocket extends along the body on a first side of the clamp rod. An end clamp releasably mates with the second end of the clamp rod. The end clamp has a foot that extends into the first side of the clamp rod. The pocket and the foot of the end clamp releasably retain a diffuser segment.

DRAWINGS

The present invention will be better understood from reading the following description of non-limiting embodiments, with reference to the attached drawings, wherein below:

DETAILED DESCRIPTION

Example embodiments of the present invention will be described more fully hereinafter with reference to the accompanying drawings, in which some, but not all embodiments are shown. Indeed, the present invention may be embodied in many different forms and should not be construed as limited to the embodiments set forth herein; rather, these embodiments are provided so that this disclosure will satisfy applicable legal requirements. For like numbers may refer to like elements throughout. This disclosure relates generally to a fixture in the form of an apparatus 20 that enables the safe removal and re-installation of a diffuser/splitter component (collectively "the diffuser") of a gas turbine assembly 10. The apparatus 20 enables the field application of coating of the lower half of the diffuser of the assembly 10 to inhibit rust development. The diffuser is supplied and installed in separate panels or portions. In the embodiments described herein, the diffuser includes six total diffuser segments 12 with three lower diffuser segments 12, weighing up to approximately 400 pounds each, forming the lower half of the diffuser for the assembly 10. The apparatus 20 disclosed herein is compatible with a variety of diffuser/splitter components and can be used for diffuser segments of different size, in different locations, and having a different weight.

Figure 1:
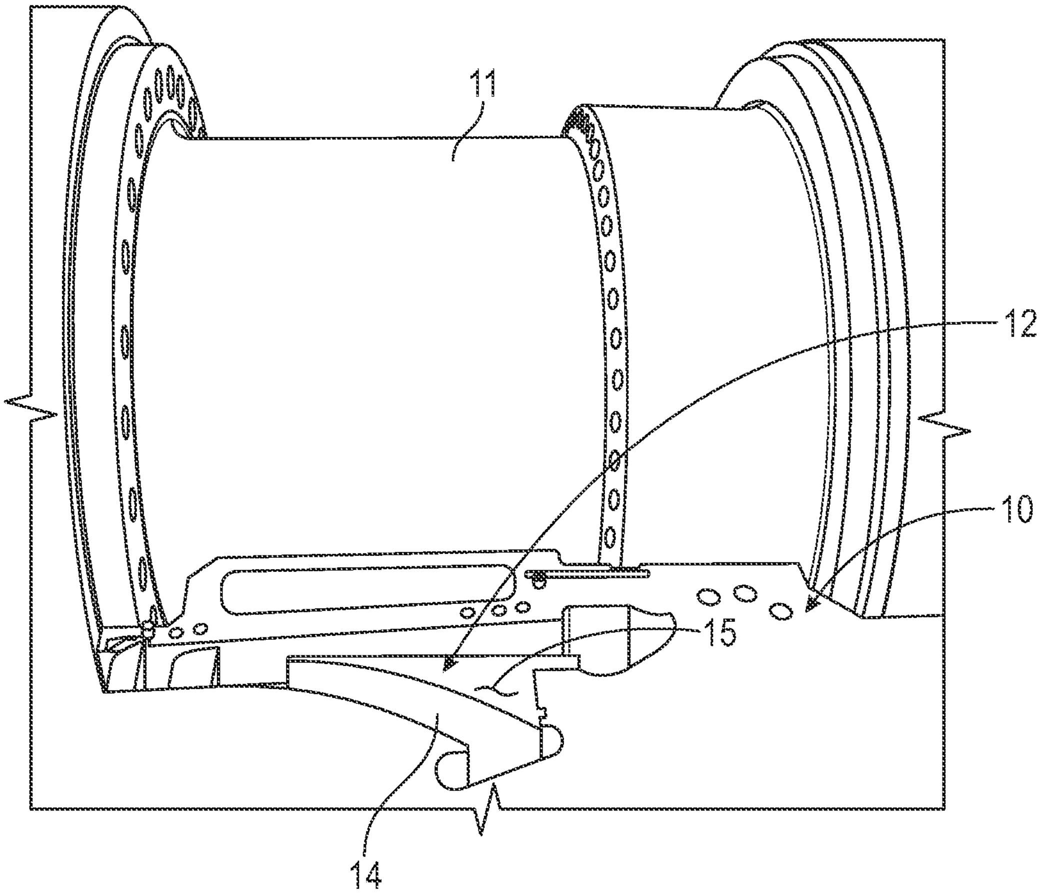
FIG. 1 shows a perspective view of an assembly with the top portion removed to reveal diffuser segments compatible with the apparatus disclosed herein, according to an embodiment of the invention.

Turning now to the figures, FIG. 1 shows an assembly 10 of an exemplary rotary machine of a gas turbine with the top portion removed that is suitable for use with embodiments of the present invention. In the field, the top portion of the surrounding housing as well as the top half of the diffuser are removed using a lifting device (e.g., a crane, a winch, etc.). The remaining lower half of the diffuser (with one of three lower half diffuser segments 12 being visible in FIG. 1) must be carefully removed and reinstalled to prevent damage to a surface coating of the diffuser segment 14 and a surface coating of the surrounding assembly 10. An exemplary embodiment of an apparatus 20 configured to support a diffuser segment 12 during removal from an assembly 10 is depicted in FIGS. 2-7, according to an embodiment of the invention.

Figure 2:
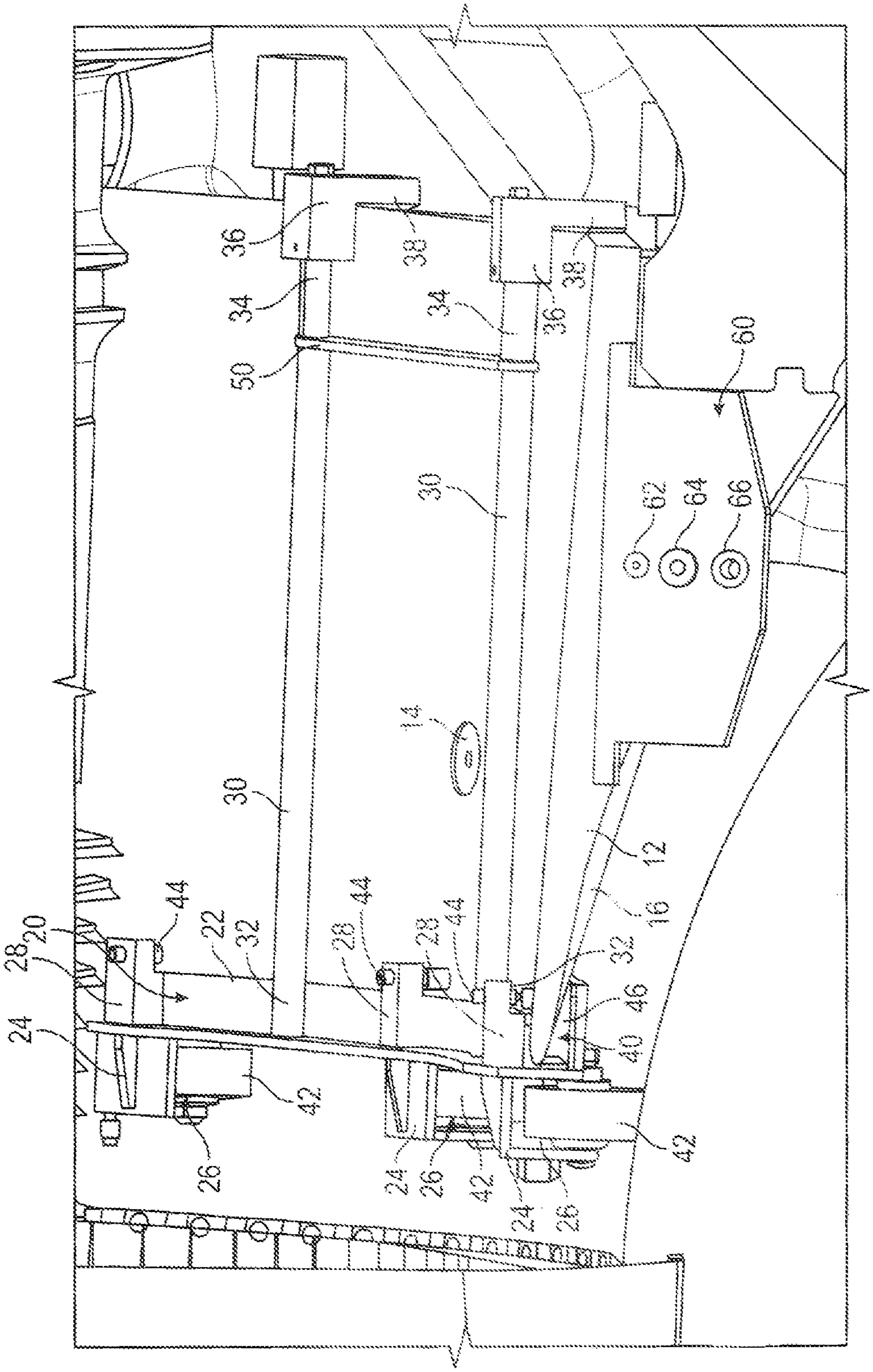
FIG. 2 shows a top view of an embodiment of the apparatus disclosed herein installed on a diffuser segment of the assembly of FIG. 1, according to an embodiment of the invention.
Figure 3:
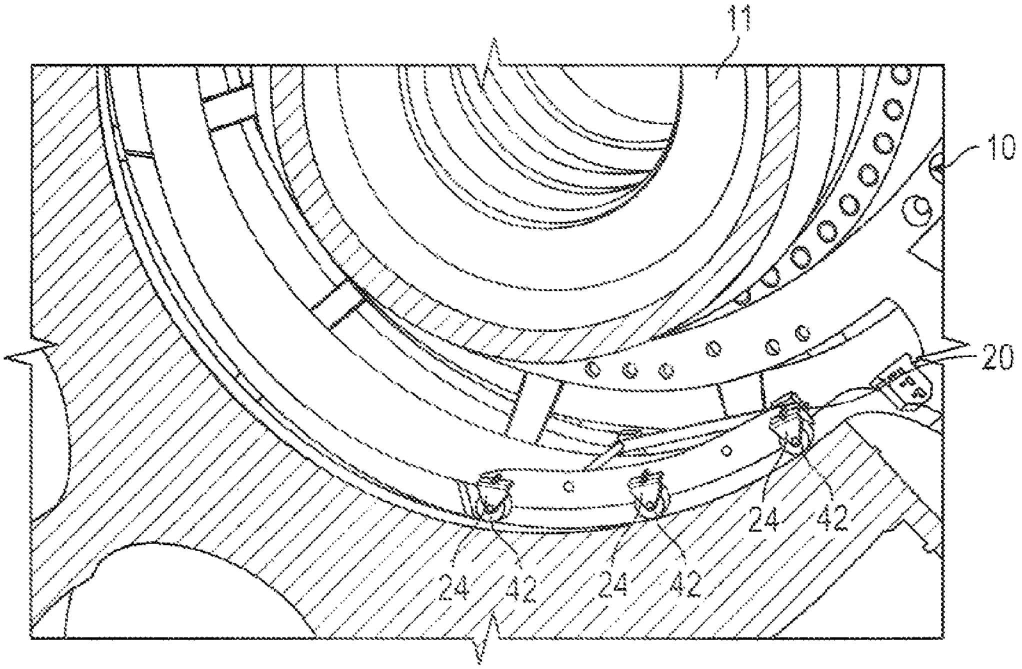
FIG. 3 shows an end view of the apparatus installed within the assembly of FIG. 2, according to an embodiment of the invention.
Figure 4:
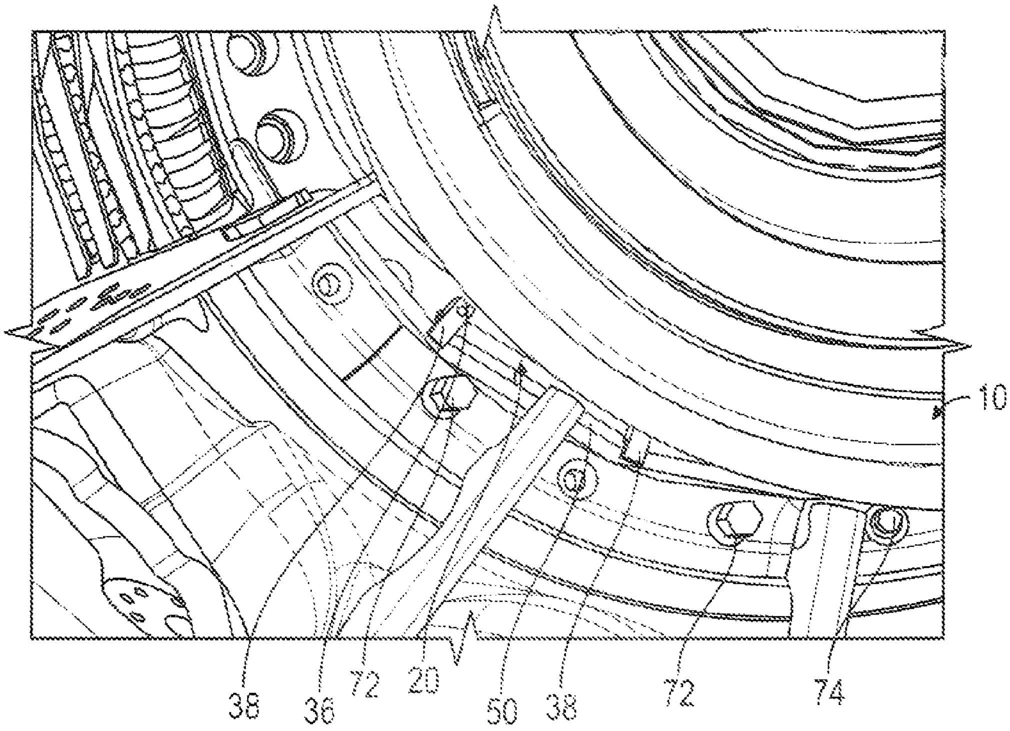
FIG. 4 shows an opposite end view of the apparatus of FIG. 3, according to an embodiment of the invention.

Referring to FIG. 2, the apparatus 20 has a body 22 including two or more supports 24 and at least one clamp rod 30. In the embodiment depicted in FIGS. 2-7, the body 22 has three supports 24 and two clamp rods 30. Each of the clamp rods 30 extends from a first end 32 to a second end 34. Referring to FIG. 3, the body 22 of the apparatus 20 is defined by a curve that is complementary to the exterior surface 14 of the diffuser segment 12. The body 22 defines a pocket 40 extending between the supports 24 on a first side of the clamp rods 30, as depicted in FIG. 2.

In some non-depicted embodiments, the body has a single support and/or a single clamp rod. A single support may be sufficient for lifting some diffuser segments. A single clamp rod may also be sufficient for lifting some diffuser segments. In one embodiment, the single clamp rod is a flattened member that extends a width substantially parallel to the pocket such that the single clamp rod can balance the diffuser segment as it is removed from the surrounding assembly. Incorporating additional support elements, including lateral supports, gussets, turnbuckles, etc. into the clamp rod does not depart from the invention disclosed herein.

In the embodiment depicted in FIGS. 2-7, a support 24 is disposed at each end of the pocket 40 and a support 24 is disposed at approximately the midpoint of the pocket 40 (as depicted in FIG. 3). The pocket 40 extends substantially the entire distance from a first of the supports 24 to a second of the supports 24. However, a different number or different locations of supports do not depart from the scope of the invention disclosed herein.

The cross-section of the pocket 40 is defined by a shape that is complementary to the exterior surface 14 of the diffuser segment 12. In some embodiments, the pocket 40 is defined by a C-shaped cross-section that may deform to accommodate the exterior surface 14 of the diffuser segment 12. Alternative shapes for the cross-section of the pocket, including but not limited to, curves, V-shaped cross-sections, etc., do not depart from the invention disclosed herein. In some embodiments, such as that depicted in FIGS. 2 and 5 specifically, the pocket 40 receives a buffer 46 that is made from a material having a material hardness that is lower than a material hardness of the surface coating 16 of the diffuser segment 12. The buffer 46 may be made out of any material with the desired material hardness, including but not limited to, thermoplastics including ultra-high-weight polyethylene, polyoxymethylene, etc.

In the embodiment depicted in FIGS. 2-7, the first end 32 of each clamp rod 30 is disposed at approximately the midpoint on the body 22 between two adjacent supports 24. In some embodiments (not depicted), the clamp rods 30 are disposed adjacent to or are incorporated into a projection 28 of each support 24. The alignment of the supports 24 relative to the clamp rods 30 helps to balance the weight of the diffuser segment 12 as it is removed from the assembly 10. The apparatus 20 allows for the efficient lifting of the diffuser segment 12 as it rotates out of the void between the surrounding assembly 10 and the spacer 11 without damaging the surface coating 16 of the diffuser segment 12.

An optional cross-member 50 extends between the clamp rods 30. In the embodiment depicted in FIGS. 2-7, the cross-member 50 and the clamp rods 30 are formed as a single united device, but a releasable cross-member does not depart from the scope of the invention disclosed herein. The cross-member 50 provides additional stability for the body 22 of the apparatus 20 and specifically maintains the second ends 34 of the clamp rods 30 at a substantially constant distance relative to one another. In one embodiment, the body 22, the supports 24, the clamp rods 30, and the cross-member 50 form a single united element. Manufacturing the apparatus 20 as a single unit in this manner can contribute to the stability of the body 22 and/or allow for additive manufacturing processes to be utilized in the manufacturing of all or portions of the apparatus 20.

Referring back to FIG. 2, an end clamp 36 releasably mates with the second end 34 of each clamp rod 30. The end clamp 36 has a foot 38 that extends into the first side of the clamp rod 30. The pocket 40 and the foot 38 of each end clamp 36 releasably retain the diffuser segment 12. In the embodiment depicted in FIGS. 2-7, at least one end clamp 36 contacts a portion of the surface coating 16 of the diffuser segment 12 and at least one foot 38 contacts an exterior surface 14 of the diffuser segment 12. The end clamp 36 releasably engages the second end 34 of the clamp rod 30 by a suitable connection means, including but not limited to, a screw, a push button, etc. In some embodiments, the end clamp 36 engages the clamp rod 30 at a variable location along the second end 34 to allow for diffuser segments 12 of different lengths to be received by the same apparatus 20. In some embodiments, a variety of end clamps are utilized with a single apparatus 20 depending on the size and location of each diffuser segment 12.

Referring to FIG. 2, a wheel 42 is received within each support 24. In the embodiment depicted in FIGS. 2-7, the wheel 42 is aligned generally perpendicular to a central axis of at least one of the clamp rods 30. In other words, an axle (not depicted) of the wheel 42 is generally parallel to a central axis of at least one of the clamp rods 30. In some non-depicted embodiments, the wheel is configured to rotate about a lateral axis generally perpendicular to an axis of rotation of the wheel (e.g., a multi-directional wheel mounted to a ball and socket joint, etc.). The wheels 42 rotate to allow the diffuser segment 12 to be removed without damaging a surface coating 16 of the diffuser segment 12. Each support 24 includes a channel 26 configured to accommodate the wheel 42 and a projection 28 extending away from the channel 26 and configured to accommodate the set screw 44. Wheels aligned in other manners or received in other ways by the apparatus 20 do not depart from the invention disclosed herein. In the embodiment depicted in FIGS. 2-7, each channel 26 is configured for low profile mounting of the wheel 42 therein. In other words, the channel 26 is configured to receive an axle of each wheel 42 that is generally aligned with a center of the cross-section of the pocket. Alternatively, the wheels 42 are configured to displace the pocket 40 a distance of a radius of the wheel 42 from the assembly 10.

In some embodiments, the set screw 44 is configured to tighten the pocket 40 of the apparatus 20 on a surface coating 16 of an exterior surface 14 of the diffuser segment 12. The set screw 44 helps the pocket 40 engage the forward end of the diffuser segment 12, which allows the apparatus 20 to accommodate casting variations in the diffuser segment 12. In some embodiments, as depicted in FIGS. 2-7, the set screw 44 (or a tip attached to the set screw 44) tightens directly against the surface coating 16 of the diffuser segment 12. In some embodiments, the set screw 44 tightens the buffer 46 against the surface coating 16 of the diffuser segment 12.

In some embodiments, the apparatus 20 is used with a drill guide 60. The drill guide 60 is a flat member that provides a plurality of holes of different diameters. In one embodiment, as depicted in FIG. 2, the drill guide 60 defines a center or pilot drill hole 62, a tap drill hole 64, and a tap hole 66. In order to use the holes of the drill guide 60, a user translates the drill guide 60 along the diffuser segment 12 and matches an edge of the drill guide 60 with the diffuser segment 12 and/or the surrounding assembly 10.

Figure 5:
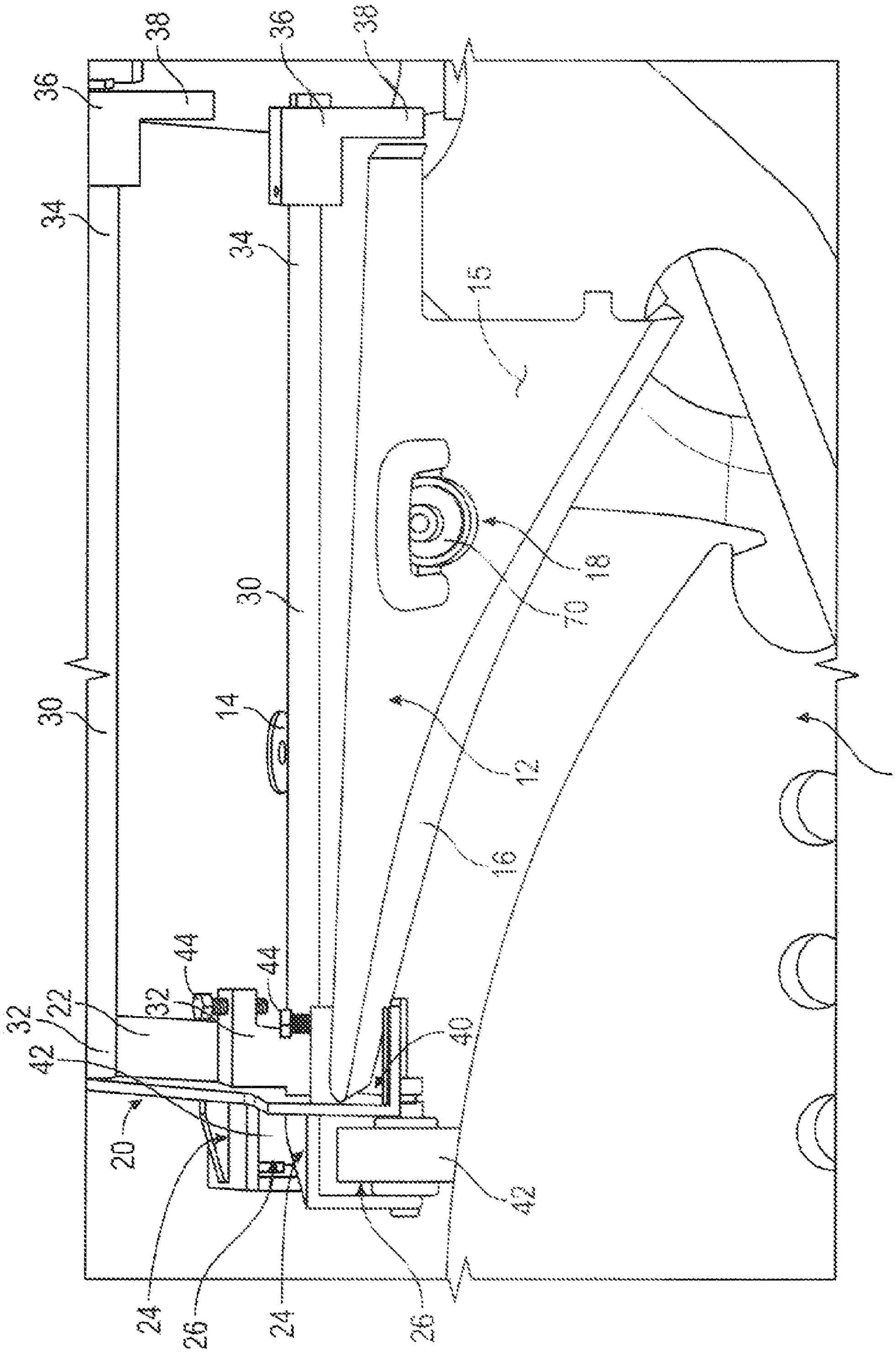
FIG. 5 shows a top view of the apparatus installed on the diffuser segment of FIG. 3, with a lift eye installed in the diffuser segment, according to an embodiment of the invention.
Figure 6:
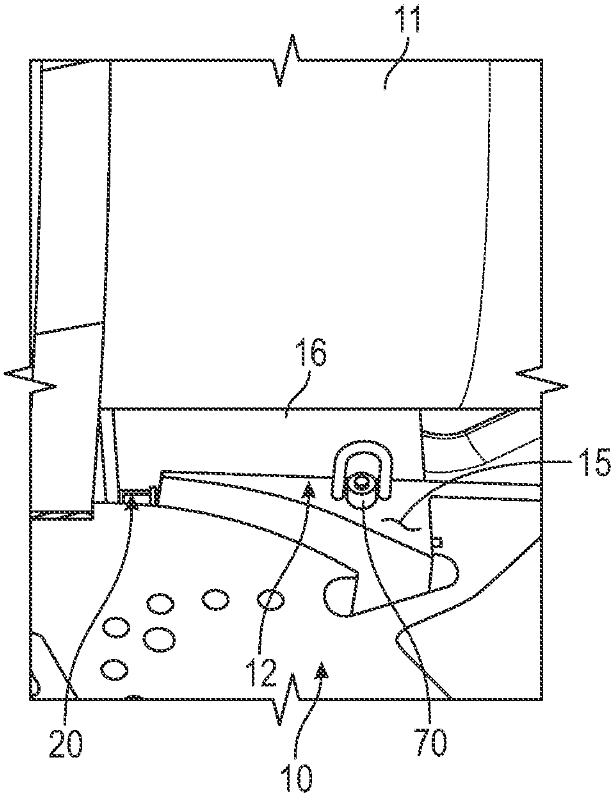
FIG. 6 shows a perspective view of the lift eye and apparatus of FIG. 5 within the surrounding assembly, according to an embodiment of the invention.
Figure 7:
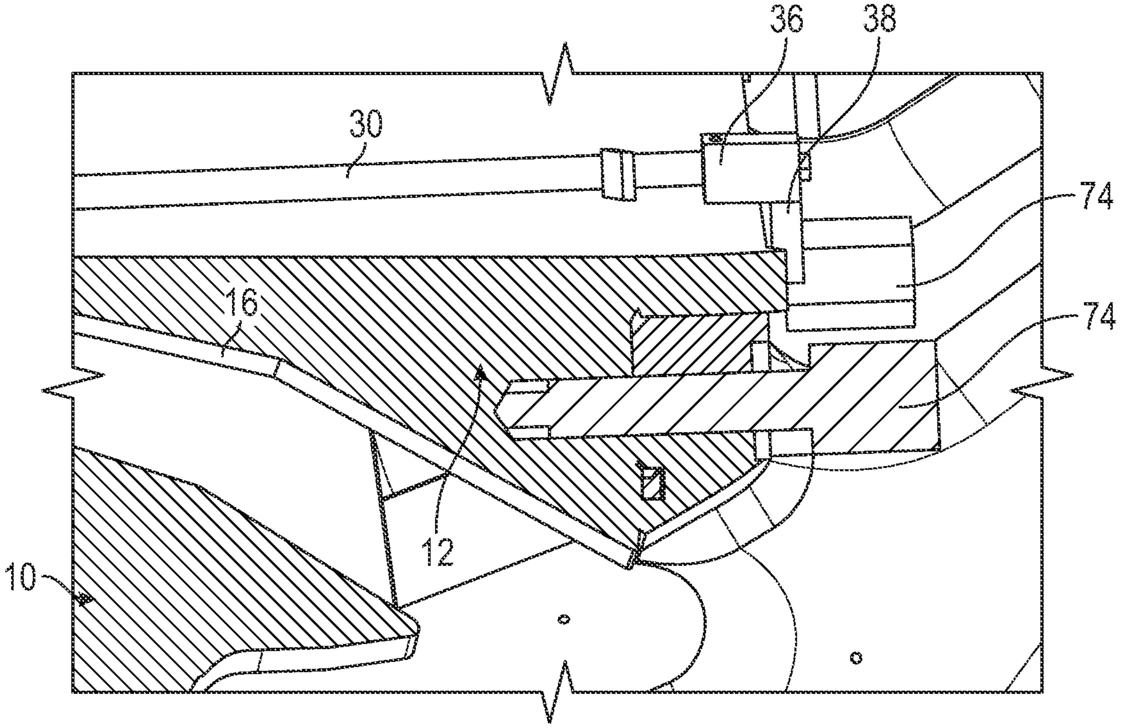
FIG. 7 shows a side sectional view of the apparatus and the assembly of FIG. 3, according to an embodiment of the invention.
Figure 8:
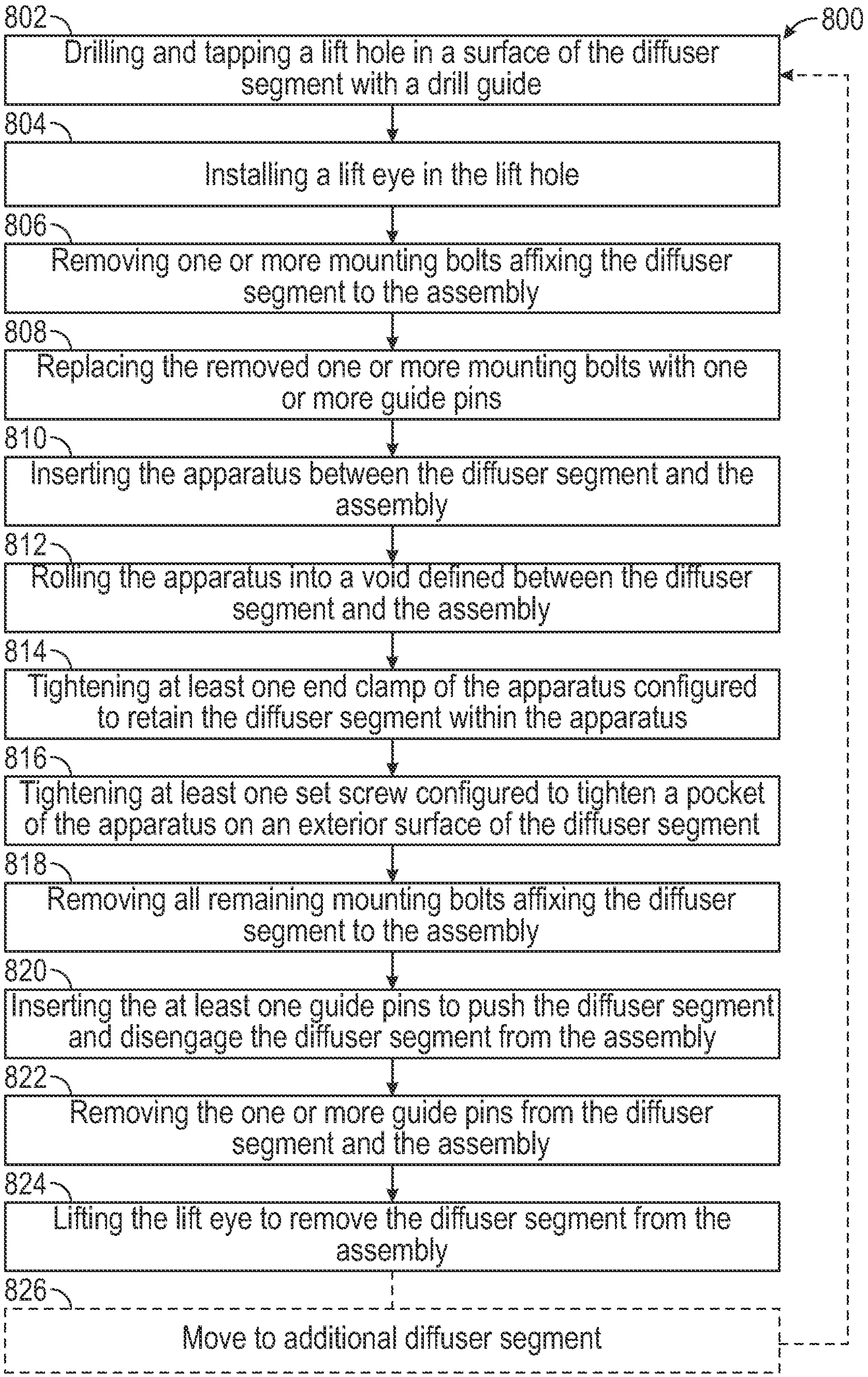
FIG. 8 shows a flow diagram of a method of removing a diffuser segment from an assembly with an apparatus, such as the exemplary apparatus shown in FIG. 2, according to an embodiment of the invention.

An exemplary embodiment of a method 800 of removing a diffuser segment from an assembly with an apparatus is illustrated in the flow diagram in FIG. 8. With reference to FIGS. 1-8, the method 800 includes drilling and tapping 802 a lift hole 18 in a surface of the diffuser segment 12 with a drill guide 60, installing 804 a lift eye 70 in the lift hole 18, removing 806 one or more mounting bolts 72 affixing the diffuser segment 12 to the assembly 10, replacing 808 the removed one or more mounting bolts 72 with one or more guide pins 74, inserting 810 the apparatus 20 between the diffuser segment 12 and the assembly 10 (as depicted in FIG. 5), rolling 812 the apparatus 20 into a void defined between the diffuser segment 12 and the assembly 10 (as depicted in FIG. 6), tightening 814 at least one end clamp 36 of the apparatus 20 configured to retain the diffuser segment 12 within the apparatus 20, tightening 816 at least one set screw 44 configured to tighten a pocket 40 of the apparatus 20 on an exterior surface 14 of the diffuser segment 12, removing 818 all remaining mounting bolts 72 affixing the diffuser segment 12 to the assembly 10, turning 820 the at least one guide pin 74 to engage the diffuser segment 12 and then push to disengage the diffuser segment 12 from the assembly 10 (as depicted in FIG. 7), removing 822 the one or more guide pins 74 from the diffuser segment 12 and the assembly 10, and lifting 824 the lift eye 70 to remove the diffuser segment 12 from the assembly 10. The pocket 40 is configured to protect the exterior surface 14 of the diffuser segment 12 during removal of the diffuser segment 12 from the assembly 10. The step of lifting 824 the lift eye 70 to remove the diffuser segment 12 from the assembly 10 includes rolling a forward end of the diffuser segment 12 on the wheels 42 and sliding an aft end of the diffuser segment 12 on a casing of the assembly 10.

Referring to FIG. 7, in certain embodiments, inserting the guide pins 74 and pushing the diffuser segment 12 to disengage a rabbet fit between the diffuser segment 12 and the assembly 10. In other words, the guide pins 74 displace, in a controlled fashion, the diffuser segment 12 in a longitudinal direction to disengage a portion of the radial connection between the diffuser segment 12 and the surrounding assembly 10. The structure of the guide pins 74 and the method of using the guide pins 74 in conjunction with the mounting bolts 72 secures the diffuser segment 12 during removal and reinstallation of the mounting bolts 72. In some embodiments, the method 800 includes moving 826 to an additional diffuser segment 12 within the assembly 10 and repeating the steps of drilling a tapping 802 a lift hole 18 through lifting 824 the lift eye 70. In other embodiments, the steps of drilling and tapping 802 a lift hole 18 using the drill guide 60 includes using a drill tool with a rotary cutting device aligned generally perpendicular to the drill guide 60, which is disposed on a mounting surface 15 of each diffuser segment 12.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. For example, parts, components, steps and aspects from different embodiments may be combined or suitable for use in other embodiments even though not described in the disclosure or depicted in the figures. Therefore, since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below. For example, references to "one embodiment" of the present invention are not intended to be interpreted as excluding the existence of additional embodiments that also incorporate the recited features.

In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. The terms "substantially," "generally," and "about" indicate conditions within reasonably achievable manufacturing and assembly tolerances, relative to ideal desired conditions suitable for achieving the functional purpose of a component or assembly. Further, the limitations of the following claims are not written in means-plus-function format and are not intended to be interpreted as such, unless and until such claim limitations expressly use the phrase "means for" followed by a statement of function void of further structure.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings, such terms are intended to be inclusive in a manner similar to the term "comprising" as "comprising" is interpreted when employed as a transitional word in a claim. That is, unless explicitly stated to the contrary, embodiments "comprising," "including," or "having" an element or a plurality of elements having a particular property may include additional such elements not having that property. Moreover, articles "a" and "an" as used in the subject specification and annexed drawings should generally be construed to mean "one or more" unless specified otherwise or clear from context to be directed to a singular form.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. An apparatus configured to support a diffuser segment during removal from or installation into an assembly, the apparatus comprising: a body including a plurality of supports and at least two clamp rods each extending from a first end to a second end, the body defining a pocket extending between the supports on a first side of the clamp rods; an end clamp releasably mating with the second end of each clamp rod, the end clamp having a foot extending into the first side of the clamp rod; and a wheel received within each support, wherein the pocket and the foot of each end clamp releasably retain the diffuser segment and wherein the wheels rotate to allow the diffuser segment to be removed without damaging a surface coating of at least one of the diffuser segment and the assembly.
2. The apparatus of any preceding clause, wherein at least one wheel is aligned generally perpendicular to a central axis of at least one clamp rod.
3. The apparatus of any preceding clause, wherein at least one wheel is configured to rotate about a lateral axis generally perpendicular to an axis of rotation of the wheel.
4. The apparatus of any preceding clause, further comprising a cross-member extending between the clamp rods.
5. The apparatus of any preceding clause, wherein the body, the plurality of supports, the at least two clamp rods, and the cross-member form a single united element.
6. The apparatus of any preceding clause, further comprising a guide defining at least one of a center or pilot drill hole, a tap drill hole, and a tap hole.
7. The apparatus of any preceding clause, further comprising a set screw configured to tighten the pocket of the apparatus against a surface coating of the diffuser segment.
8. The apparatus of any preceding clause, further comprising a set screw configured to tighten against a surface coating of the diffuser segment.
9. The apparatus of any preceding clause, wherein the support further comprises a channel configured to accommodate the wheel and a projection extending away from the channel and configured to accommodate a set screw.
10. The apparatus of any preceding clause, wherein the channel is configured to receive an axle of each wheel, the axle is generally aligned with a center of a cross-section of the pocket.
11. The apparatus of any preceding clause, wherein the wheels are configured to displace the pocket a distance of a radius of the wheel from the assembly.
12. The apparatus of any preceding clause, wherein a cross-section of the pocket is defined by a C shape and the pocket extends substantially an entire distance from a first of the supports to a second of the supports.
13. The apparatus of any preceding clause, wherein the pocket extends from a first end to a second end, a support is disposed at each end of the pocket, and a support is disposed approximately at a midpoint of the pocket.
14. The apparatus of any preceding clause, wherein the pocket receives a buffer that is made from a material having a material hardness that is lower than a material hardness of a surface coating of the diffuser segment.
15. The apparatus of any preceding clause, further comprising a set screw configured to tighten the buffer against the surface coating of the diffuser segment.
16. The apparatus of any preceding clause, wherein the body of the apparatus is defined by a curve that is complementary to the exterior surface of the diffuser segment.

17. The apparatus of any preceding clause, wherein the first end of each clamp rod is disposed at approximately a midpoint on the body between two adjacent supports.
18. The apparatus of any preceding clause, wherein at least one end clamp contacts a portion of a surface coating of the diffuser segment and at least one foot contacts an exterior surface of the diffuser segment.
19. The apparatus of any preceding clause, wherein at least one end clamp engages the clamp rod at a variable location along the second end.
20. A method of removing a diffuser segment from or installing a diffuser segment into an assembly with an apparatus, the method comprising: drilling and tapping a lift hole in a surface of the diffuser segment with a drill guide; installing a lift eye in the lift hole; removing one or more mounting bolts affixing the diffuser segment to the assembly; replacing the removed one or more mounting bolts with one or more guide pins; inserting the apparatus between the diffuser segment and the assembly and rolling the apparatus into a void defined between the diffuser segment and the assembly; tightening at least one end clamp of the apparatus configured to retain the diffuser segment within the apparatus; tightening at least one set screw configured to tighten a pocket of the apparatus on an exterior surface of the diffuser segment; removing all remaining mounting bolts affixing the diffuser segment to the assembly; inserting the at least one guide pin to push the diffuser segment and disengage the diffuser segment from the assembly; removing the one or more guide pins from the diffuser segment and the assembly; and lifting the lift eye to remove the diffuser segment from the assembly, wherein the pocket is configured to protect the exterior surface of the diffuser segment during removal of the diffuser segment from the assembly.
21. The method of any preceding clause, further comprising disengaging a rabbet fit between the diffuser segment and the assembly.
22. The method of any preceding clause, further comprising repeating the steps of drilling and tapping a lift hole through lifting the lift eye to additional diffuser segments within the assembly.
23. The method of any preceding clause, wherein the step of drilling and tapping a lift hole using the drill guide further comprises placing the drill guide on a mounting surface of each diffuser segment and using a drill tool with a rotary cutting device aligned generally perpendicular to the drill guide to drill and tap the lift hole.
24. An apparatus configured to support a diffuser segment during removal from or installation into an assembly, the apparatus comprising: a body defined by a curve that is complementary to an exterior surface of the diffuser segment, the body including at least one support and at least one clamp rod and defining a pocket, the clamp rod extending from a first end to a second end, and the pocket extending along the body on a first side of the clamp rod; an end clamp releasably mating with the second end of the clamp rod, the end clamp having a foot extending into the first side of the clamp rod, wherein the pocket and the foot of the end clamp releasably retain the diffuser segment.
25. The apparatus of any preceding clause, wherein the support further comprises a channel configured to accommodate a wheel and a projection extending away from the channel and configured to accommodate a set screw.
26. The apparatus of any preceding clause, wherein the pocket receives a buffer that is made from a material having a material hardness that is lower than a material hardness of a surface coating of the diffuser segment, and wherein each set screw configured to tighten the buffer against a surface coating of the diffuser segment.
27. The apparatus of any preceding clause, further comprising two clamp rods and a cross-member extending between the clamp rods.
28. The apparatus of any preceding clause, further comprising a wheel received within the support, wherein the wheel rotates to allow the diffuser segment to be removed without damaging a surface coating of the diffuser segment and/or the assembly.
29. The apparatus of any preceding clause, wherein the pocket extends from a first end to a second end, a first support is disposed at the first end of the pocket, a second support is disposed approximately at a midpoint of the pocket, and a third support is disposed at the second end of the pocket.

What is claimed is:

1. A method of removing a diffuser segment from or installing a diffuser segment into an assembly with an apparatus, the method comprising:

drilling and tapping a lift hole in a surface of the diffuser segment with a drill guide;

installing a lift eye in the lift hole;

removing one or more mounting bolts affixing the diffuser segment to the assembly;

replacing the removed one or more mounting bolts with one or more guide pins;

inserting the apparatus between the diffuser segment and the assembly and rolling the apparatus into a void defined between the diffuser segment and the assembly;

tightening at least one end clamp of the apparatus configured to retain the diffuser segment within the apparatus;

tightening at least one set screw configured to tighten a pocket of the apparatus on an exterior surface of the diffuser segment;

removing all remaining mounting bolts affixing the diffuser segment to the assembly;

inserting the at least one guide pin to push the diffuser segment and disengage the diffuser segment from the assembly;

removing the one or more guide pins from the diffuser segment and the assembly; and lifting the lift eye to remove the diffuser segment from the assembly, wherein the pocket is configured to protect the exterior surface of the diffuser segment during removal of the diffuser segment from the assembly.

2. The method of claim 1, further comprising disengaging a rabbet fit between the diffuser segment and the assembly.

3. The method of claim 1, further comprising repeating the steps of drilling and tapping a lift hole through lifting the lift eye to additional diffuser segments within the assembly.

4. The method of claim 3, wherein the step of drilling and tapping a lift hole using the drill guide further comprises placing the drill guide on a mounting surface of each diffuser segment and using a drill tool with a rotary cutting device aligned perpendicular to the drill guide to drill and tap the lift hole.

5. A method of removing a diffuser segment from or installing a diffuser segment into an assembly with an apparatus, the method comprising:

removing one or more mounting bolts affixing the diffuser segment to the assembly;

replacing the removed one or more mounting bolts with one or more guide pins;

inserting the apparatus between the diffuser segment and the assembly;

securing the diffuser segment within the apparatus;

removing all remaining mounting bolts affixing the diffuser segment to the assembly;

inserting the at least one guide pin to push the diffuser segment and disengage the diffuser segment from the assembly; and removing the one or more guide pins from the diffuser segment and the assembly.

6. The method of claim 5, further comprising:

drilling and tapping a lift hole in a surface of the diffuser segment with a drill guide; and installing a lift eye in the lift hole.

7. The method of claim 6, further comprising repeating the steps of drilling and tapping a lift hole through lifting the lift eye to additional diffuser segments within the assembly.

8. The method of claim 7, wherein the drilling and tapping a lift hole using the drill guide further comprises placing the drill guide on a mounting surface of each diffuser segment and using a drill tool with a rotary cutting device aligned perpendicular to the drill guide to drill and tap the lift hole.

9. The method of claim 6, further comprising lifting the lift eye to remove the diffuser segment from the assembly.

10. The method of claim 5, further comprising disengaging a rabbet fit between the diffuser segment and the assembly.

11. The method of claim 5, further comprising rolling the apparatus into a void defined between the diffuser segment and the assembly after the inserting of the apparatus between the diffuser segment and the assembly.

12. The method of claim 11, wherein the rolling of the apparatus comprises rolling a forward end of the diffuser segment on a set of wheels and sliding an aft end of the diffuser segment on a casing of the assembly.

13. The method of claim 5, wherein the securing of the diffuser segment within the apparatus comprises:

tightening at least one end clamp of the apparatus configured to retain the diffuser segment within the apparatus; and tightening at least one set screw configured to tighten a pocket of the apparatus on an exterior surface of the diffuser segment.

14. The method of claim 13, wherein the pocket is configured to protect the exterior surface of the diffuser segment during removal of the diffuser segment from the assembly.

15. The method of claim 5, wherein the inserting of the at least one guide pin comprises turning the at least one guide pin to engage the diffuser segment.

* * * * *